United States Patent
Davidson

(10) Patent No.: US 6,353,179 B1
(45) Date of Patent: Mar. 5, 2002

(54) CABLE ENTRY SYSTEM

(75) Inventor: Paul Anthony Davidson, Mac Chesfield (GB)

(73) Assignee: Artform International Limited, Leichestershire (GB)

( * ) Notice: Subject to any disclaimer, the term of this patent is extended or adjusted under 35 U.S.C. 154(b) by 0 days.

(21) Appl. No.: 09/230,106

(22) PCT Filed: Jul. 15, 1997

(86) PCT No.: PCT/GB97/01906

§ 371 Date: Sep. 22, 1999

§ 102(e) Date: Sep. 22, 1999

(87) PCT Pub. No.: WO98/04023

PCT Pub. Date: Jan. 29, 1998

(30) Foreign Application Priority Data

Jul. 24, 1996 (GB) .............................................. 9615536

(51) Int. Cl.⁷ ................................................ H02G 3/08
(52) U.S. Cl. ......................... 174/48; 174/65 R; 248/56
(58) Field of Search ............................... 174/48, 65 R, 174/151, 152 R, 153 R; 285/158, 161, 162; 248/56

(56) References Cited

U.S. PATENT DOCUMENTS

| | | | | |
|---|---|---|---|---|
| 4,711,974 A | * | 12/1987 | Borsh ........................ | 174/65 R |
| 4,860,791 A | * | 8/1989 | Putnam .................... | 285/162 X |
| 4,922,573 A | * | 5/1990 | Miller et al. ............. | 174/152 R |
| 4,967,524 A | * | 11/1990 | Hull et al. ................... | 52/198 |
| 5,200,575 A | * | 4/1993 | Sheehan .................... | 174/65 R |
| 5,214,247 A | * | 5/1993 | Tamm ........................ | 174/65 R |
| 5,285,013 A | * | 2/1994 | Schnell et al. ............. | 174/65 R |
| 5,422,437 A | * | 6/1995 | Schnell ....................... | 174/65 R |
| 5,614,696 A | * | 3/1997 | Oakes ..................... | 174/151 X |
| 5,811,728 A | * | 9/1998 | Maeda ....................... | 174/65 R |

FOREIGN PATENT DOCUMENTS

| | | | |
|---|---|---|---|
| EP | 435067 A2 | * | 7/1991 |
| GB | 2306200 A | * | 10/1995 |
| WO | WO95/27165 | * | 10/1995 |

* cited by examiner

Primary Examiner—Dean A. Reichard
Assistant Examiner—Angel R. Estrada
(74) Attorney, Agent, or Firm—Edwin D. Schindler

(57) ABSTRACT

A cable entry system includes a length of a grooved pipe adapted for extending through a bore in a wall. A further length of pipe is able to be connected to a rear portion of a socket on an inner side of the wall, with a cap having an aperture through which a cable is able to pass. An additional length of pipe is adapted to be closed by the cap on an outer side of the wall. The cap may be provided with an external circumferential tooth for snapping into a groove of the grooved pipe. In an alternative embodiment, the aperture in the cap is formed by an axially extending slot, which extends through the inner end of the cap, so that the cap may be fitted after installation of the cable. In an additional embodiment, the outer end of the pipe is secured by a C-shaped clip, which engages one of the grooves of the pipe, with the cap being annular and having a central opening defining the axially-facing aperture, and with an inwardly directed circumferential rib of the annular cap adapted for engaging a groove in the C-shaped clip.

13 Claims, 1 Drawing Sheet

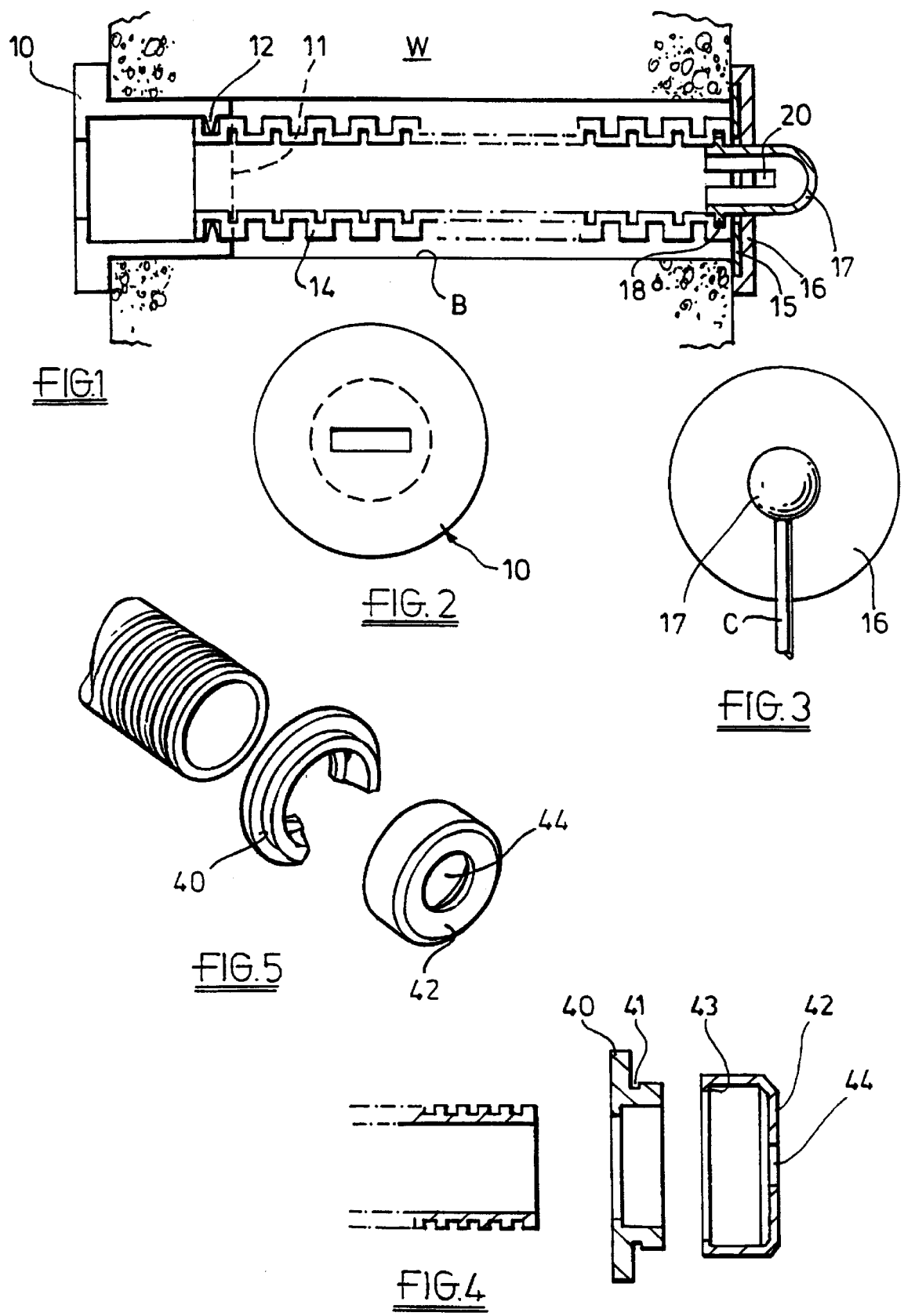

CABLE ENTRY SYSTEM

This invention concerns a cable entry system for leading a cable through a wall into the back of a socket such as a telephone socket or TV aerial socket for example.

Generally such sockets are surface mounted and the cables are led thereto through a bore in the wall which is "made-good" on the outer surface with mastic or similar material. This is unsightly and generally inconvenient.

According to the present invention, there is provided a cable entry system comprising a length of pipe which is adapted to extend through a bore in a wall and to be connected to the rear of a socket on the inside of the wall and to be closed by a cap on the outside of the wall, said cap having an aperture therein through which a cable may pass.

The pipe may be of the kind having axially spaced circumferential ribs separated by grooves on both its inner and outer surfaces.

The socket may be mounted substantially flush with the wall surface and have a circular port in its rear provided with an internal circumferential tooth whereby the pipe may connected with the socket by a snap action, the tooth locating in one of said circumferential grooves.

The outer end of the pipe may be secured by a C-shaped clip which engages one of said circumferential grooves.

The aperture may be radially facing.

The cap may have an external circumferential tooth adapted to snap into one of the internal grooves of the pipe.

The aperture in the cap may be formed by an axially extending slot which extends through the inner end of the cap, whereby the cap may be fitted after installation of the cable.

An annular cover plate may be provided to fit over the C-shaped clip.

The aperture may be axially facing.

The cap may be annular and have a central opening defining said aperture.

The cap may have an inwardly directed circumferential rib adapted to engage a circumferential groove in the C-shaped clip.

The invention will be further apparent from the following description with reference to the several figures of the accompanying drawing which show, by way of example only, two forms of cable entry system embodying same.

Of the drawings:

FIG. 1 shows a cross-section through a first system;
FIG. 2 shows a front view of the system of FIG. 1;
FIG. 3 shows a rear view of the system of FIG. 1;
FIG. 4 shows an exploded cross-section through a second system; and
FIG. 5 shows an exploded perspective view of the system of FIG. 4.

Referring firstly to FIGS. 1–3, it will be seen that a telephone socket 10 is mounted substantially flush with the surface of a wall W. The casing of the socket 10 has a rearwardly directed tubular portion which provides a cable entry port 11. The port 11 has an internal circumferential tooth 12.

A length of pipe 14 of the kind having axially spaced circumferential ribs separated by grooves on both its inner and outer surfaces extends through a bore B in the wall W.

The pipe is connected with the rear of the socket 10 by pushing the parts together, the tooth 12 engaging one of the grooves on the outer surface of the pipe with a snap action.

The outer end of the pipe 14 is secured by a C-shaped clip 15 which can be snapped onto the pipe to be located in one of the circumferential grooves on the outside of the pipe.

An annular cover plate 16 is fitted over the clip 15 to present a neat and tidy appearance.

A domed cap 17 having an outwardly directed circumferential tooth 18 is pushed into the outer end of the pipe 14 to close same, the tooth 18 locating in one of the internal circumferential grooves of the pipe 14 with a snap action.

A slot 20 extends from the inner end of the cap 17 axially to a position adjacent the domed end of the cap to provide a radially facing aperture through which a cable C may extend. Since the slot 20 opens through the inner end of the cap, the cap may be fitted after installation of the cable.

Referring now to FIGS. 4 and 5 it will be seen that on the second system the clip 15 is replaced by one 40 having a circumferential groove 41 on its outer periphery and the parts 16 and 17 by a cap 42 having an inwardly directed circumferential rib 43 adapted to engage the groove 41 with a snap action. The cap 42 has a central opening 44 defining an axially facing aperture through which a cable may be passed.

It will be appreciated that it is not intended to limit the invention to the above examples only, many variations, such as might readily occur to one skilled in the art, being possible, without departing from the scope thereof as defined by the appended claims.

What is claimed is:

1. A cable entry system, comprising:
    a length of a grooved pipe adapted for extending through a bore in a wall;
    a further length of pipe connectable to a rear portion of a socket on an inner side of the wall;
    a cap having an aperture through which a cable is able to pass, said cap having an external circumferential tooth for snapping into a groove of said length of said grooved pipe; and,
    an additional length of pipe being closable by said cap on an outer side of the wall.

2. The cable entry system according to claim 1, wherein said pipe has axially spaced circumferential ribs separated by grooves on both its inner surface and its outer surface.

3. The cable entry system according to claim 1, wherein said additional length of pipe at the outer side of the wall is secured by a C-shaped clip which engages a groove of said length of said grooved pipe.

4. The cable entry system according to claim 3, further comprising an annular cover plate fitted over said C-shaped clip.

5. The cable entry system according to claim 1, wherein said aperture is radially facing.

6. The cable entry system according to claim 1, wherein said cap is annular and has a central opening defining said aperture.

7. A cable entry system, comprising:
    a length of a grooved pipe adapted for extending through a bore in a wall;
    a further length of pipe connectable to a rear portion of a socket on an inner side of the wall;
    a cap having an aperture through which a cable is able to pass, said aperture in said cap being formed by an axially extending slot extending through an inner end of said cap, so that said cap is able to be fitted after installation of the cable; and,
    an additional length of pipe being closable by said cap on an outer side of the wall.

8. The cable entry system according to claim 7, wherein said pipe has axially spaced circumferential ribs separated by grooves on both its inner surface and its outer surface.

9. The cable entry system according to claim 7, wherein said additional length of pipe at the outer side of the wall is secured by a C-shaped clip which engages a groove of said length of said grooved pipe.

10. The cable entry system according to claim 7, further comprising an annular cover plate fitted over said C-shaped clip.

11. A cable entry system, comprising:

a length of a grooved pipe adapted for extending through a bore in a wall;

a further length of pipe connectable to a rear portion of a socket on an inner side of the wall;

an annular cap having a central opening defining an axially-facing aperture through which a cable is able to pass, said annular cap further including an inwardly directed circumferential rib; and, an additional length of pipe being closable by said annular cap on an outer side of the wall, said additional length of pipe being secured by a C-shaped clip which engages a groove of said length of said grooved pipe, said inwardly directed circumferential rib of said annular cap being engagable in a groove of said C-shaped clip.

12. The cable entry system according to claim 11, wherein said pipe has axially spaced circumferential ribs separated by grooves on both its inner surface and its outer surface.

13. The cable entry system according to claim 11, further comprising an annular cover plate fitted over said C-shaped clip.

* * * * *